United States Patent [19]
Doyle et al.

[11] B 3,925,294
[45] Dec. 9, 1975

[54] CONTROLLING VISCOSITY OF CHLOROPRENE-SULFUR COPOLYMERS

[75] Inventors: Alfred Michael Doyle, Londonderry, Ireland; William Shear, Louisville, Ky.

[73] Assignee: E. I. Du Pont de Nemours and Company, Wilmington, Del.

[22] Filed: Jan. 17, 1973

[21] Appl. No.: 324,505

[44] Published under the Trial Voluntary Protest Program on January 28, 1975 as document no. B 324,505.

[52] U.S. Cl. ............... 260/29.7 SQ; 260/29.7 N; 260/29.7 H; 260/30.2; 260/30.8; 260/92.3
[51] Int. Cl.² ................ C08F 2/22; C08F 2/44
[58] Field of Search... 260/29.7 SQ, 29.7 N, 29.7 H, 260/30.2, 30.8, 92.3

[56] References Cited
UNITED STATES PATENTS

| | | | |
|---|---|---|---|
| 2,234,215 | 3/1941 | Youker | 260/30.2 |
| 3,105,055 | 9/1963 | Aho | 260/30.8 |
| 3,308,085 | 3/1967 | Sparks et al. | 260/29.7 |
| 3,318,832 | 5/1967 | Sparks et al. | 260/29.7 |
| 3,320,201 | 5/1967 | Sparks et al. | 260/29.7 |
| 3,325,527 | 6/1967 | Hardy et al. | 260/30.8 |
| 3,362,925 | 1/1968 | Jenkins et al. | 260/29.7 |
| 3,378,538 | 4/1968 | Sparks et al. | 260/92.3 |
| 3,488,313 | 1/1970 | Sparks et al. | 260/29.7 |

*Primary Examiner*—Allan Lieberman
*Assistant Examiner*—T. DeBenedictis, Sr.

[57] ABSTRACT

In a process wherein chloroprene is polymerized in an aqueous emulsion in the presence of a small amount of dissolved sulfur to give a latex of rubbery polymer in which the polymer is plasticized by the addition of a tetraalkyl thiuram disulfide and a sodium alkyl dithiocarbamate and the polymer is isolated in a multiplicity of viscosity grades, plasticization of each viscosity grade is completed within a reasonably short time and viscosity of the plasticized polymer remains essentially constant for a substantial period if the mole ratio of dithiocarbamate to thiuram disulfide used is substantially constant and the total amount of dithiocarbamate plus thiuram disulfide present is varied to give isolated polymers of each desired viscosity.

8 Claims, No Drawings

3,925,294

CONTROLLING VISCOSITY OF CHLOROPRENE-SULFUR COPOLYMERS

BACKGROUND OF THE INVENTION

It is known that plastic polychloroprene can be produced by polymerizing chloroprene in the presence of a small amount of dissolved sulfur in an aqueous emulsion using a peroxy compound as the polymerization initiator. The polymer while still dispersed in the water is plasticized by the addition of certain sulfur compounds such as tetraalkyl thiuram disulfides and sodium alkyl dithiocarbamates. The plasticized polymer is then isolated from the latex by any of the usual methods, such as by drum drying or freezing. Information about the state of the art is contained in U.S. Pat. Nos. 2,234,215; 3,105,055; 3,325,527; 3,308,085; 3,318,832; 3,320,201; 3,362,925; 3,488,313.

An increase in the sulfur concentration in the polymerization of chloroprene leads to rubbers having increased plasticity. Variations in the concentrations of thiuram and dithiocarbamate afford a means of varying the degree of plasticization of polymer having a given sulfur content; an increase in their concentrations leads to increased plasticity. In this manner several viscosity grades of neoprene can be made from a single latex by treating separate portions of the latex with different concentrations of plasticizing agents.

One method of making several viscosity grades of neoprene from a given latex involves adding a given, fixed amount of thiuram to the latex and varying the quantity of dithiocarbamates in the separate portions of latex as required to obtain the desired viscosity levels. In this procedure the given amount of the thiuram disulfide is usually added to the latex at the end of the polymerization reaction, dithiocarbamate being added at a later time in varying quantity to separate portions of the latex. Neoprenes spanning a viscosity range of 30 Mooney viscosity points or more may be made from a single latex by this procedure.

For reasons of scheduling in commerical production it is desirable that the peptization reaction be completed within a reasonably short period of time and that the viscosity of the dispersed, plasticized polymer in the latex be essentially constant from the time of completion of the plasticization reaction until isolation of the polymer from its latex. For efficient operation it is generally desirable that polymer be isolated from its latex within a period between about 8 and 20 hours after completion of the polymerization reaction. Consequently it is preferred that the plasticization be completed before the 8 hour mark and that the viscosity of polymer in the latex be essentially constant between the 8 and 20 hour marks. If plasticization continues past 8 hours, polymer viscosity will drop continuously and the viscosity of isolated polymer will vary depending upon the time of isolation. On the other hand, it frequently happens that when additional dithiocarbamate is added to speed peptization of the latex in which the reaction is going slowly, polymer viscosity will increase during the 8–20 hour period instead of remaining constant as desired.

When a multiplicity of polymer viscosity grades are made from a latex containing a chloroprene-sulfur copolymer of a given composition dispersed therein, using the method of peptizing the latex with a fixed amount of thiuram and varying quantities of dithiocarbamate, it becomes very difficult to achieve the goal of essentially constant polymer viscosity during the 8–20 hour period in the preparation of all viscosity grades within the range. If the fixed thiuram concentration is selected to achieve the goal for a single viscosity grade the goal may not be met in the preparation of other grades, and the difficulty in meeting the goal will increase with increasing breadth of range of viscosity grades. This problem, as a consequence of the need to control the isolated polymer viscosity within narrowly specified limits, may interfere with efficient scheduling of plant equipment and cause increased costs thereby. Worse yet, the problem may cause the preparation of polymer outside the specified viscosity range.

SUMMARY

The instant invention is an improved process for preparing a multiplicity of polymer viscosity grades by varying the degree of plasticization of an aqueous, alkaline dispersion of a chloroprene-sulfur copolymer of given composition. The improvement comprises using a substantially constant dithiocarbamate-to-thiuram ratio in the preparation of each viscosity grade and varying the total amount of dithiocarbamate and thiuram to give isolated polymers with the desired viscosities. By this process plasticization of each viscosity grade is complete within a reasonably short time and the viscosity of the plasticized polymer remains essentially constant for a substantial period, thereby permitting improved control of the viscosity of the isolated polymer.

DESCRIPTION OF PREFERRED EMBODIMENTS

Ratios of dithiocarbamate to thiuram useful in the operation of this invention cover a broad range. Generally the preferred molar ratio of dithiocarbamate to thiuram disulfide will fall within the range between 0.25 and 2.5; however, values outside this range may also be used. For the preferred sodium dibutyldithiocarbamate, a molar ratio of 0.8 to 1.2 is especially preferred as it gives the best balance between peptization rate and viscosity stability after peptization. At lower ratios peptization rate tends to decline and polymer viscosity to continue falling during the period that stability is desired. At higher ratios polymer viscosity tends to increase during the period that stability is desired.

Combined amounts of dithiocarbamate and thiuram useful in the operation of the invention will vary with the final viscosity desired. Generally, total combined quantities of both reagents between 0.0015 gram mole and 0.0060 gram mole per 100 g of polymer will give polymers with viscosities covering a broad useful range. For preparation of lower viscosities a relatively larger quantity of the two reagents will be needed and for higher viscosities relatively less of the peptizing agents will be required.

The present invention is applicable to the preparation of plastic polychloroprene elastomers which can be 100% polychloroprene or elastomers prepared from chloroprene with minor amounts (up to 50%) of another ethylenically unsaturated copolymerizable compound such as styrene, methyl methacrylate, butadiene, and 2,3-dichlorobutadiene. The term "polychloroprene" as used in this specification includes such copolymers.

The emulsifying agents used in carrying out the polymerization process can be any of those commonly employed in the emulsion polymerization of chloroprene, such as the alkali salts (sodium, potassium, ammonium, etc.) of long chain or polynuclear carboxylic acids such as oleic, stearic, abietic, and those made from hydrogenation or disproportionation of rosin acids. Ordinarily, the presence of at least some acid-stable dispersing agents is preferable and is necessary where the dispersion is acidified as part of the coagulation process. Such acid-stable dispersing agents are exemplified by the water soluble salts of of sulfonic acids of long hydrocarbon chains, or of polycyclic systems, or water soluble salts of sulfuric acid esters of long chain alcohols. Sodium salts of the condensation products of formaldehyde and a naphthalene sulfonic acid are especially preferred, (e.g. Lomar PW, Nopco Chemical Division).

The amount of sulfur used is the same as that heretofore employed in the polymerization of chloroprene and will ordinarily be from 0.25% to 2.0% of the monomer to be polymerized, depending upon the plasticity desired.

Any of the organic or inorganic peroxy compounds such as benzoyl peroxide, perbenzoic acid, sodium persulfate, dicumyl peroxide, commonly used as polymerization initiators, may be employed in effecting the polymerization.

Thiurams and dithiocarbamates useful in this invention are the tetraalkyl-substituted thiuram disulfides and the water soluble disubstituted dithiocarbamates in which the alkyl substituent on the nitrogen atom are open chain alkyl groups or alkylene groups in which both ends are attached to the nitrogen, such as dipentamethylene thiuram disulfide, dihexamethylene thiuram disulfide, tetramethyl-, tetraethyl-, tetrabutyl- and tetraoctyl thiuram disulfides and the corresponding disubstituted dithiocarbamates. These compounds are added as solutions or aqueous dispersions, preferably dispersions of their solutions in hydrocarbon solvents.

Plasticization rate varies with temperature, the rate increasing with increasing temperature. Increasing temperature also tends to shorten the period during which the viscosity is stable after plasticization is complete. A useful temperature range for conducting the plasticiation reaction is 15°C.–50°C. Ambient temperature, i.e. 23°–27°C., is preferred as this temperature.

Plasticization rate also varies with the pH of the latex, increasing as pH increases. Although plasticization proceeds at lower pH values, a pH of 10 or greater is required for practical plasticization rates. A pH range of 11.0 to 12.3 is preferred.

The term "chloroprene-sulfur copolymer of given composition" used in the description of the invention means that the sulfur content of the polymer is constant within plus or minus 10%.

The term "substantially dithiocarbamate to thiuram ratio" also used in the description of the invention includes those values that are both lower and higher by 25%.

EXAMPLE 1

A polymer dispersion is made by emulsifying 100 parts by weight of chloroprene, containing in solution 4 parts wood rosin and 0.6 part of sulfur, in a water solution containing 114 parts of water, 0.7 part of sodium hydroxide, $4 \times 10^{-5}$ part of copper ion, and 0.6 part of the sodium salts of the condensation product of naphthalene sulfonic acids with formaldehyde. The sodium hydroxide in one phase reacts with the rosin in the other, forming sodium salts of the rosin which act as the main emulsifying agent. The emulsified chloroprene is then polymerized at 40°C. by adding as catalyst a solution of 0.3 part of potassium persulfate and 0.0075 part of the sodium salt of anthraquinone beta-sulfonic acid in 5.7 parts of water. Part of this is added at the start and part during the course of the polymerization to maintain a fairly uniform rate of polymerization. The course of the polymerization is followed by determining the specific gravity of the dispersion. When this reaches 1.075 at 40°C., corresponding to 86% conversion to polymer, the reaction is "short-stopped" by adding 0.5 part of 4,4′-thiobis-6-t-butyl-o-cresol dissolved in 0.38 part of toluene dispersed in a solution of 0.008 part of the sodium salts of the condensation product of naphthalene sulfonic acid with formaldehyde and 0.0114 part of sodium lauryl sulfate in 0.3715 part of water, and the emulsion is cooled to 25°C.

EXAMPLE 2

The polymer dispersion prepared in Example 1 is divided into 3 portions, and to the portions, respectively, is added 0.00105 mole, 0.00122 mole, and 0.00139 mole of tetraethylthiuram disulfide per 100 g. of chloroprene monomer present in the initial emulsion. The thiuram is added as a solution of 36 parts of thiuram in 50 parts of toluene dispersed in a solution of 1 part of the sodium salts of the condensation product of naphthalene sulfonic acid with formaldehyde and 1.5 parts of sodium lauryl sulfate in 38 parts of water. Following the thiuram addition, 0.00118 mole, 0.00137 mole, and 0.00155 mole respectively, of sodium dibutyldithiocarbamate per 100 g. of chloroprene monomer present in the initial emulsion are added as a 47% solution in water, maintaining a dithiocarbamate to thiuram molar ratio of 1.1 in each of the three portions of the polymer dispersion. After an aging period of approximately 3 hours at 25°C., unpolymerized chloroprene is stripped from the polymer dispersion using steam in a turbanular flow tube, as described in U.S. Pat. No. 2,467,679. After being stripped the latex samples are cooled to 25°C., and each is subdivided for isolation after various periods of aging up to 18 hours. At the time selected for isolation additional thiuram dispersion is added to each sample to give 1.7% of free thiuram in the isolated product, and then 10% acetic acid solution is added to adjust the pH to 5.7. Isolation is carried out by continuously freezing a thin layer of the latex as being described in U.S. Pat. No. 2,187,146 and washing and drying the resulting polymer film. Mooney viscosities of samples isolated at the various times are shown in Table I.

EXAMPLE 3

Polymer dispersion used in this experiment is made by the procedure described in Example 1 except that chloroprene is replaced by a mixture of chloroprene and 2,3-dichloro-1,3-butadiene containing 2% by weight of 2,3-dichloro-1,3-butadiene. The dispersion is divided into 5 portions and to these are added respectively, for each 100 g. of chlorobutadiene monomers present in the initial emulsion, 0.00102 mole, 0.00118 mole, 0.00135 mole, 0.00152 mole, and 0.00169 mole of the tetraethylthiuram disulfide dispersion described in Example 2. Following the thiuram addition 0.00114 mole, 0.00133 mole, 0.00151 mole, 0.00170 mole, and 0.00190 mole, respectively, of sodium dibutyldithiocarbamate per 100 g of chlorobutadiene monomers present in the initial emulsion are added as a 47% solution in water, maintaining a dithiocarbamate to thiuram molar ratio of 1.1 in each of the five portions of polymer dispersion. Each portion is stripped of unpolymerized monomers, further subdivided into samples, and isolated after various aging times using the procedure described in Example 2. Mooney viscosities of samples isolated after various aging times are shown in Table I. These data and those of Example 2 demonstrate that the process of the instant invention yields latexes in which the polymer viscosity is essentially constant after an initial 8-hour aging period in the preparation of polymer at each of several different viscosity levels.

EXAMPLE 4

Conditions used in this example are outside the scope of the instant invention.

Polymer dispersion is prepared as in Example 1 and 0.00118 mole of tetraethylthiuram disulfide per 100 g. of chloroprene monomer present in the initial emulsion is added in the form of the thiuram dispersion described in Example 2. The polymer dispersion is divided into three parts, and 0.00037 mole, 0.00132 mole, and 0.00260 mole, respectively, of sodium dibutyldithiocarbamate per 100 g. of chloroprene monomer present in the initial emulsion are added to the parts. Samples of each of the parts were isolated after various alkaline aging times by the procedure described in Example 2.

Mooney viscosity data of the isolated samples are shown in Table I, and they demonstrate that when a different dithiocarbamate to thiuram ratio is used for the preparation of each of different viscosity grades by plasticization of a given polymer dispersion, the polymer viscosities in the plasticized dispersions are not stable during subsequent alkaline aging in the case of some of the viscosity grades.

These Mooney viscosity data were determined according to ASTM D-1646. The large rotor was used at 100°C and the viscosity was measured after a 2.5 minute time interval.

TABLE I

| | | | Viscosities at Different Isolation Age[1] | | | | |
|---|---|---|---|---|---|---|---|
| | | | 5 | 8 | 11 | 15 | 17 |
| Example 2 | | | | | | | |
| A,[2] moles | B,[3] moles | A/B | | | | | |
| .00118 | .00105 | 1.1 | 66 | 66 | 66 | 67 | 68 |
| .00137 | .00122 | 1.1 | 56 | 55 | 55 | 56 | 58 |
| .00155 | .00139 | 1.1 | 50 | 47 | 46 | 47 | 48 |
| Example 3 | | | | | | | |
| A, moles | B, moles | A/B | | | | | |
| .00114 | .00102 | 1.1 | 76 | 75 | 74 | 75 | 76 |

TABLE I-continued

| | | | Viscosities at Different Isolation Age[1] | | | | |
|---|---|---|---|---|---|---|---|
| | | | 5 | 8 | 11 | 15 | 17 |
| .00133 | .00118 | 1.1 | 67 | 65 | 65 | 64 | 65 |
| .00151 | .00135 | 1.1 | 61 | 56 | 55 | 54 | 55 |
| .00170 | .00152 | 1.1 | 51 | 48 | 48 | 48 | 48 |
| .00190 | .00169 | 1.1 | 48 | 43 | 42 | 41 | 42 |
| Example 4 | | | | | | | |
| A, moles | B, moles | A/B | | | | | |
| .00037 | .00118 | 0.32 | 105 | 85 | 81 | 80 | |
| .00132 | .00118 | 1.11 | 63 | 61 | 61 | 63 | |
| .00195 | .00118 | 2.21 | 50 | 51 | 53 | 57 | |

[1]Time from addition of dithiocarbamate to polymer dispersion until isolation of the polymer, hours at 25°C.
[2]Sodium dibutyldithiocarbamate, moles per 100 g. of chlorobutadiene monomers
[3]Tetraethylthiuram disulfide, moles per 100 g. of chlorobutadiene monomers

We claim:

1. In a process for polymerizing chloroprene, containing up to 50% by weight of an ethylenically unsaturated monomer copolymerizable therewith, in an aqueous emulsion containing a small amount of dissolved sulfur, to give a latex of rubbery polymer in which the polymer is plasticized by the addition of a tetraalkyl thiuram disulfide and a sodium alkyl dithiocarbamate and isolating the polymer from said latex in a multiplicity of Mooney viscosity grades, the improvement which comprises (1) maintaining the mole ratio of said dithiocarbamate to said thiuram disulfide substantially constant in the preparation of each viscosity grade and (2) varying the total amount of dithiocarbamate plus thiuram disulfide present to give isolated polymers of each desired viscosity grade.

2. A process of claim 1 in which no other monomer than chloroprene is present in the polymerization step.

3. A process of claim 1 in which the polymerized chloroprene is isolated from its latex within a period of 8 to 20 hours after completion of the polymerization reaction.

4. A process of claim 1 in which the mole ratio of dithiocarbamate to thiuram disulfide is within the range of 0.2 to 2.5:1.

5. A process of claim 1 in which the plasticization reaction is conducted at a temperature of 15° to 50°C.

6. A process of claim 1 in which the pH of the plasticization reaction is 10 or greater.

7. A process of claim 1 in which the proportion of sulfur used in the polymerization reaction is from 0.25% to 2% by weight of the monomer to be polymerized.

8. A process of claim 1 in which the dissolved sulfur contained in the starting aqueous emulsion is dissolved in the chloroprene monomer being polymerized.

* * * * *